United States Patent
Müller et al.

[11] B 3,925,528
[45] Dec. 9, 1975

[54] METHOD FOR PREPARING A COMPLETELY COVERED FOAM MOLDING

[75] Inventors: Karl-Heinz Müller, Leverkusen; Harry Röhr, Koenigsdorf, Cologne; Karl-Heinz Ott, Leverkusen, all of Germany

[73] Assignee: Bayer Aktiengesellschaft, Leverkusen, Germany

[22] Filed: June 13, 1972

[21] Appl. No.: 262,241

[44] Published under the Trial Voluntary Protest Program on January 28, 1975 as document no. B 262,241.

[30] Foreign Application Priority Data
June 15, 1971 Germany............................ 2129523

[52] U.S. Cl.................... 264/54; 260/23; 264/45.4; 264/46.4; 264/DIG. 14
[51] Int. Cl.² ........................................ B29D 27/08
[58] Field of Search ....... 264/45, 54, DIG. 14, 45.4, 264/45.6

[56] References Cited
UNITED STATES PATENTS

| | | | |
|---|---|---|---|
| 2,806,812 | 9/1957 | Merz................................ | 264/54 X |
| 2,948,651 | 8/1960 | Waag................................ | 264/45 X |
| 2,959,508 | 11/1960 | Graham et al.................... | 264/54 X |
| 3,043,627 | 7/1962 | Torjusen.......................... | 264/45 X |
| 3,091,946 | 6/1963 | Kesling............................ | 264/45 X |
| 3,163,686 | 12/1964 | Dusel et al....................... | 264/45 |
| 3,381,999 | 5/1968 | Steere.............................. | 264/45 X |
| 3,706,679 | 12/1972 | Hopton et al..................... | 264/54 X |
| 3,723,586 | 3/1973 | Foster et al...................... | 264/54 X |

OTHER PUBLICATIONS
Bikales–Extrusion and Other Plastics Operations, Wiley–Interscience (N.Y.), 1971, pp. 128.
Bikales–Characterization of Polymers, Wiley–Interscience (N.Y.), 1971, pp. 97–98.

*Primary Examiner*—H. S. Cockeram
*Attorney, Agent, or Firm*—Connolly and Hutz

[57] ABSTRACT

A moulded article consisting of:

A. a core comprising a foamed thermoplastic or elastic-thermoplastic polymer which has a uniform density of from 0.2 to 0.8 g/cm³ or which has a plurality of zones of different uniform densities of from 0.2 to 0.8 g/cm³; and B. a homogeneous covering layer of a vinyl chloride polymer containing a plasticiser which completely covers the core (A) on all sides.

5 Claims, 4 Drawing Figures

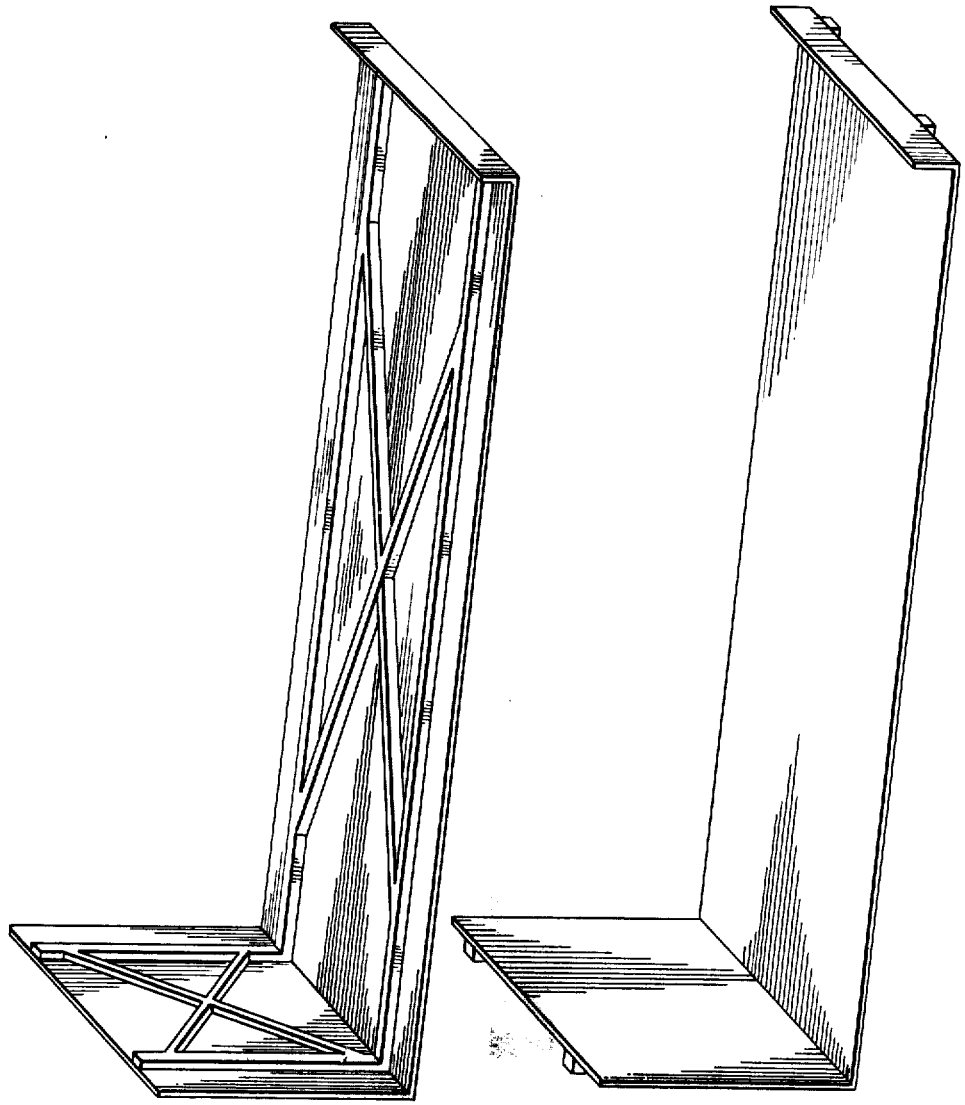

METHOD FOR PREPARING A COMPLETELY COVERED FOAM MOLDING

This invention relates to foamed thermoplastic or elasticthermoplastic mouldings which are covered on all sides with a completely closed covering layer and to a process for producing these mouldings.

No previous attempts to produce such mouldings have been completely successful.

Thus mouldings obtained by the process of German Offenlegungsschrift No. 1,814,343 have the following properties: The foam core has a density $\geq 0.8$ g/cm$^3$. This density is not constant but dependent on the distance from the feedhead. The density of the foam cannot be predetermined as desired in this process. As the process uses injection moulding, the size of obtainable mouldings is limited.

Another method consists in stacking a plurality of ABS sheets, placing sheets containing a blowing agent in the middle and sheets without a blowing agent above and below them and covering the stack at the top and bottom with covering sheets, e.g., of polyvinyl chloride or polymethylmethacrylate and then welding the complete stack in a press under heat and/or pressure, thus activating the blowing agent. If the distance between the plates of the press is then increased, the central portion of the stack foams to fill the space between the plates completely. On cooling, a so-called sandwich panel is obtained which contains a foamed core and unfoamed covering layers. This sandwich panel is then processed into the final shaped articles by pneumatic hot shaping. This method is obviously very difficult and complicated. It also has other disdavantages, namely 1. The shaped articles are always thinner than the sandwich panel and their wall thickness is not uniform, but depends on the degree of deformation.
2. The wall thickness is determined by the thickness of the sandwhich panel and the shaping conditions and cannot be altered at will within the moulded article.
3. The necessity to use pneumatic hot shaping, forbids to introduce reinforcements or installations in the foam core of the sandwich panel.
4. The shaping method is incapable to produce sharp edges or strongly curved surfaces.
5. It is impossible to obtain a covering layer which is closed on all sides.

Another possibility consists in first producing a foamed moulding by injection moulding, which does not yield foam denisty of less than 0.5 g/cm$^3$ and uniform foam structure, and then coating this moulding, e.g., with a coat of lacquer. This obviously requires at least one additional operation and very often aftertreatment finishing treatment such as polishing, smoothing, impregnating or reinforcing.

Lastly, moulded articles comprising a core of foamed material and a covering layer can be produced by so-called rotational moulding or centrifugal casting, e.g., according to German Offenlegungsschrift No. 1,812,772. Although a uniform foam density can thus be obtained it cannot be used for producing mouldings with variable wall thicknesses and demarcated zones of varying densities. A continuous covering layer is obtained only on one side of the foam core and moreover the process requires complicated apparatus.

The present invention relates to moulded articles of

A. a core of a foamed thermoplastic or elastic-thermoplastic polymer having a uniform density of from 0.2 to 0.8 g/cm$^3$ or having a plurality of zones of different uniform densities of from 0.2 to 0.8 g/cm$^3$ and B. a homogeneous covering layer completely covering coe (A) on all sides and consisting of a vinyl chloride polymer containing a plasticiser.

Core (A) may in principle consist of any foamed thermoplastic or elastic-thermoplastic polymer, for example copolymers of styrene with other vinyl or vinylidene compounds (e.g., acrylonitrile, methylmethacrylate); polymethylmethacrylate; homopolymers and copolymers of vinyl chloride.

So-called rubber modified diphasic plastics are particularly suitable. These are mixtures of an elastomeric component and a thermoplastic component of limited compatibility. The thermoplastic component generally constitutes the continuous phase and the elasticising component the discontinuous phase of the mixture. The elastomeric component is preferably a graft polymer based on a rubber. Particularly suitable rubbers for this purpose are homopolymers and copolymers of butadiene or isoprene containing not more than 50 percent by weight of copolymerised styrene, acrylonitrile and/or a lower alkyl ester of acrylic or methacrylic acid. Polyalkylacrylates are also suitable, e.g., polybutylacrylate or copolymers of butyl acrylate with other lower alkyl esters (preferably $C_1 - C_6$) of acrylic or methacrylic acid, trans- and cis-polypentenamers, block copolymers of butadiene and styrene, ehtylene-propylene terpolymers (tercomponent e.g., hexa-1,5-diene, norbornene or norbornadiene) and chlorinated polyethylenes. Styrene and/or a styrene derivative, e.g. an alkylstyrene such as α-methylstyrene or para-tertiary-butyl styrene and optionally acrylonitrile and/or an acrylonitrile derivative, e.g., an alkylacrylonitrile such as methacrylonitrile, is then graft polymerised onto such rubbers. Methylmethacrylate may also be graft polymerised onto these rubbers as an additional or as the only monomer. The resulting graft polymer may then be mixed with a thermoplastic component which is generally a thermoplastic resin obtained from the grafted monomer or monomers. If the rubber content is less than 50 percent, the graft polymers may also be used on their own.

The covering layer (B) consists of a vinyl chloride polymer containing a plasticiser. Particularly suitable for this purpose is a mixture of a. from 30 to 90 percent by weight of a vinyl chloride polymer which contains not more than 30 percent by weight of co-monomer and has a K-value according to Fikentscher of from 40 to 90; and b. from 70 to 10 percent by weight of a plasticiser.

The plasticisers may be saturated or unsaturated monomeric or polymeric plasticisers or any mixtures thereof.

Suitable monomeric plasticisers are monoesters and diesters of adipic acid, glutaric acid, phthalic acid, tetrahydrophthalic acid, hexahydrophthalic acid, azelaic acid, sebacic acid, benzoic acid and trimellitic acid and diesters or triesters of phosphoric acid, the esterification components being preferably aliphatic alcohols containing 4 to 20 C atoms. Alkylsulphonic acid esters of phenols and cresols with alkyl radicals containing 13 to 21 carbon atoms are also suitable.

Suitable unsaturated plasticisers are: Diallylphthalate, diallyladipate, the various diallyl esters of homologues of adipic acid, ethylene glycol dimethacrylate, polyethylene glycol dimethacrylate, allyl acrylate, allyl methacrylate and other multifunctional esters of acrylic or methacrylic acid.

Suitable polymeric plasticisers are: Polycondensation products of saturated and/or unsaturated dicarboxylic acids and polyhydric alcohols, in particular polycondensation products of succinic acid, glutaric acid, adipic acid, sebacic acid, azelaic acid, phthalic acid, tetrahydrophthalic acid, hexachloroendomethylene tetrahydrophthalic acid, trimellitic acid, maleic acid, fumaric acid, itaconic acid or citaconic acid with ethylene glycol, diethylene glycol, propanediol, butanediol, hexanediol, trimethylolpropane or pentaerythritol.

A particularly suitable material for the core (A) is a polymer of the following composition:

1. from 5 to 60 percent by weight of a rubbery elastic butadiene or an isoprene polymer containing not more than 50 percent by weight of copolymerised styrene, acrylonitrile or the lower alkyl ($C_1 - C_6$) esters of acrylic or methacrylic acid or polyalkyl acrylates or cis- and trans-polypentenamers or an ethylene-propylene terpolymer containing not more than 10 percent by weight of tercomponents;
2. from 95 to 40 percent by weight of polymerised (a) styrene, alkylstyrene, methyl methacrylate or mixtures thereof and (b) styrene, acrylonitrile, alkylacrylonitrile, methylmethacrylate or mixtures thereof in a proportion by weight of (a):(b) from 95:5 to 50:50.

In this polymer, the monomers 2 have been partly or completely polymerised in the presence of the rubber polymer and a remainder of monomers 2 if any is added in the form of a separately made copolymer therefrom.

Particularly preferred vinyl chloride polymers containing plasticisers used for covering layer (B) are mixtures of a. from 30 to 85 percent by weight, most preferably from 50 to 85 percent by weight, of a vinyl chloride copolymer containing a maximum of 20 percent by weight of comonomers and having a Fikentscher K value of from 55 to 80, which is suitable for preparing a plastisol; or a mixture of from 90 to 30 percent by weight, more preferably 40 to 85 percent by weight, of a vinyl chloride polymer which has a K-value of from 55 to 80 and a particle size of from 0.2 to 50 $\mu$, more preferably 0.2 to 20 $\mu$, and 10 to 70 percent by weight, more preferably 60 to 15 percent by weight, of a vinyl chloride polymer which has a K-value of from 55 to 80 and a particle size in the range of 50 to 500 $\mu$; and b. from 70 to 15 percent by weight of a saturated or unsaturated monomeric plasticiser or mixtures of such plasticisers, in which the vinyl chloride polymers are not completely soluble. The following are examples of such plasticisers:
  1. Esters of phthalic acid, adipic acid, sebacic acid, azelaic acid, phosphoric acid, trimellitic acid, pyromellitic acid or benzoic acid in which the alcoholic component contains from four to 13 carbon atoms and may be derived from identical or different alcohols;
  2. dialkylphthalate or multifunctional esters of acrylic or methacrylic acid such as ethylene glycol dimethacrylate, polyethylene glycol dimethacrylate, allylacrylate, or allylmethacrylate.

The moulded article according to the invention may be produced as follows: The vinyl chloride polymer containing a plasticiser which is to form the covering layer (B), prepared to a consistency such that it can be spread by brush or trowel or sprayed, is applied to the internal surfaces of a one-part or multipart mould to form a layer, for example of 0.1 to 2 mm in thickness. The mould must be preheated to 30 to 150°C before application of this layer. Thereafter, the mould is completely filled with particles of the polymer containing a chemical or physical blowing agent which is to form the core (A). The mould is then closed so that gas can still pass out and heated to a temperature of 150° to 270°C. It is kept at this temperature until uniform formation of foam and covering layer has been effected even in the regions of highest mass concentration.

The polymers forming the core (A) must be in a pourable form, e.g., in the form of beads or granules. Their particle diameter is preferably from 0.5 to 4 mm and more particularly from 0.5 to 3 mm. It is particularly preferred to use beads or granulates which have a bulk density equal to the density of the resulting foam.

The blowing agent for foaming the polymers must be present in the interior of the polymer particles, i.e., not only on the surface of the particles. It is therefore incorporated either while the polymers are granulated or in a separate compounding step. Either chemical or physical blowing agents may be used. If a chemical blowing agent is used, its decomposition temperature must be within the operating temperature range of the polymer. Chemical blowing agents in the context of this invention are therefore chemical compounds which decompose at the processing temperature to liberate a gas which is inert under the reaction conditions. Suitable examples are azodicarbonamide and sulphohydrazides and particularly benzazimide. Physical blowing agents in the context of this invention are mainly low boiling inert liquids. The boiling point of these liquids must be below the second order transition temperature of the polymer used. Low boiling hydrocarbons such as pentane or hexane and low boiling halogenated hydrocarbons, especially fluorochlorinated hydrocarbons, are examples of suitable physical blowing agents. These blowing agents must be present in a quantity which is sufficient to ensure complete fusion of the polymer granulate. The amount used is generally in the range from 0.5 to 5 percent, based on the weight of polymer. Prefoamed polymers may also be used. In this embodiment the bulk density of the material, which determines the density of the foam, can be varied within wide limits. Granulates of different bulk densities are used in order to obtain zones of different densities in the core (A). This is advantageous where a moulded article has parts of greatly differing wall thickness such as ribs or reinforced edges, to increase rigidity and mechanical stability.

Prefoaming of the polymers may be carried out by two different methods: Two or more blowing agents of different decomposition temperatures can be added to the polymer and only the blowing agent which decomposes or boils at the lower temperature is spent in the preforming stage. Alternatively only one blowing agent may be present which is partly spent in prefoaming. The remainder of the blowing agent is then available for the moulding precess proper.

The vinyl chloride polymers containing plasticiser forming the covering layer (B) are so selected that they have a limited compatibility with the core (A) and that the covering layer cannot become detached from the moulded article. Their viscosity must be equal to or higher than that of the foaming melt at the operating temperature.

Compatibility of the covering layer and the foam core may be improved by means of textiles or non-textile fabrics as bonding agents. Bonding may also be achieved by adding a certain amount of plasticisers which partly dissolve or swell the core and thereby act as binders to a certain extent.

The hardness of the covering layer can be modified by the addition of fillers or hard and brittle polymers such as styrene-acrylonitrile copolymers or polymethylmethacrylate.

Pigments and dyes may be incorporated in the covering layer. Flame retarding additives such as antimony trioxide or halogenated phosphoric acid esters may also be added to the covering layer.

The vinyl chloride polymers used for the covering layer in all cases contain stabilisers, for example dialkyl tin mercaptides, dialkyl tin maleic acid semiesters, the barium-cadmium salts of higher carboxylic acid, diphenylthiourea or 2-phenylindole. Co-stabilisers may also be added, e.g., epoxidised soya bean oil or linseed oil, n-alkyl epoxy stearates, epoxide resins or chelate forming substances such as alkyl-arylphosphites or alkylphosphites or UV stabilisers and light protective agents.

The covering layer of the moulded articles according to the invention should preferably contain both saturated and unsaturated monomeric or polymeric plasticisers. In that case, plastisols prepared with relatively high plasticiser contents have a low viscosity and can therefore easily be sprayed and polymerisation and cross-linking reactions of such plastisols result in tough elastic, hard covering layers from which the plasticiser cannot migrate or be evaporated or extracted.

It is particularly advantageous to add to the vinyl chloride polymers small quantities of peroxides whose decomposition temperature lies within the range of the operating temperatures. Examples of such peroxides are benzoyl peroxide, tertiary butyl perbenzoate, dicumyl peroxide, cumene hydroperoxide and di-tert.-butyl peroxide.

The vinyl chloride polymers may also contain from 0.1 to 5 percent of a lubricant, extender or levelling agent, e.g., a saturated or unsaturated fatty acid ester.

A formulation for the covering layer is given below by way of example:
from 40 to 85 parts by weight of vinyl chloride homopolymer or copolymer;
from 60 to 15 parts by weight of a plasticiser ratio of plasticiser which can be cross-linked to plasticiser which cannot be cross-linked equals 100 : 0 to 0 : 100;
0.5 parts by weight of epoxide stabiliser or plasticiser;
from 0.5 to 10 parts by weight of a PVC stabiliser;
from 0.1 to 5 percent by weight of a peroxide compound, based on the plasticiser component which can be cross-linked;
from 0 to 10 parts by weight of a substance for lowering the viscosity; and
from 0 to 5 parts by weight of pigments, dyes, levelling agents and UV stabilisers.

The foaming pressures produced in the mould during production of the moulded article are below 5 atmospheres if gas, situated e.g., between the particles of granulate, is capable of escaping from the mould. This is ensured by providing degasification or outlet apertures in inconspicuous parts of the mould or by providing small tubes through which the contents of the mould can communicate with the external atmosphere in the parts of increased wall thickness such as ribs, etc..

Since foaming progresses from the wall of the mould to the interior, practically no internal pressure is produced in the mould so long as gas can escape to the outside. It is only when the layers furthest away from the surface melt and start to foam that a slight pressure is built up but by that time the process is already completed.

Lightweight moulds may therefore be used for the process, e.g., moulds made of steel sheeting of from 1 to 2 mm in thickness reinforced with steel sections forming a suitable support construction (steel corset). The mould may also be made of aluminium sheets or of aluminium blocks which have been hollowed out.

FIG. 1 shows the reinforced steel corset in perspective.

FIG. 2 shows the steel frame in perspective.

Figure 4:
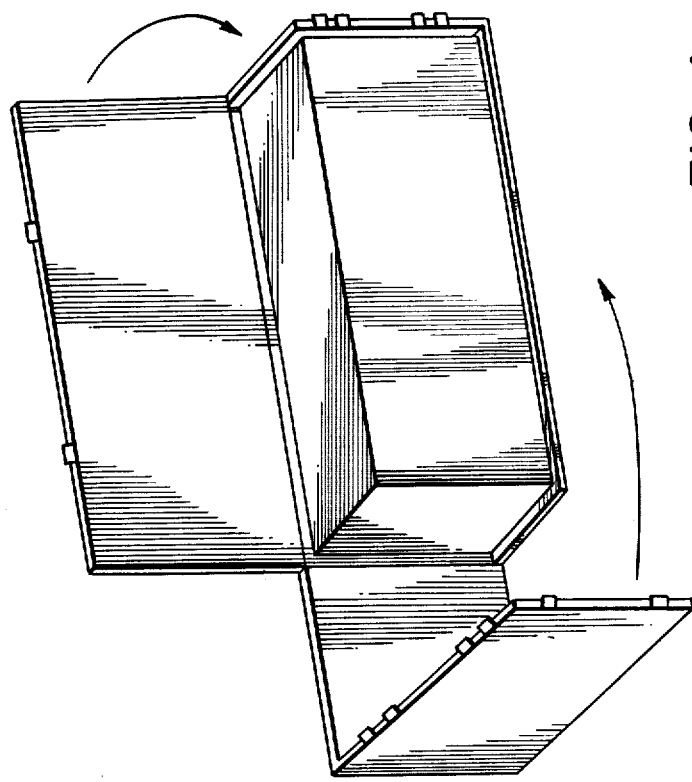
FIG. 4 shows the core positioned inside the hinged frame box, and the mould ready for closing.

The moulded products according to the invention are genuine composite materials. They may be used for new fields of application for which thermoplasts could previously not be used, e.g., the construction of vehicles, boat- and shipbuilding, the production of prefabricated building elements and sanitary units and the manufacture of furniture.

The parts given in the following examples are parts by weight unless otherwise indicated.

EXAMPLE 1

A. Mould

A two-part mould of 2 mm steel sheet is used which consists of a trough-shaped jacket and a trough-shaped core with the following dimensions:

|  | Height | Width | Depth |  |
|---|---|---|---|---|
| a) Jacket | 1,600 | 600 | 90 | mm |
| b) Core | 1,570 | 570 | 75 | mm |

The jacket and core are supported by a corset and covered with a frame section which holds them together. Grooves 5 mm deep and equal in width to the thickness of the sheet metal are cut into this frame section (see FIG. 2) at a distance apart of 15 mm. These sections hold the jacket and core. The profile section has apertures with a diameter of 4 mm arranged at intervals of 150 mm to enable air and if necessary excess foam to escape. At two points of the frame one such aperture is provided with an outlet tube with an internal diameter of about 2 mm which dips to a depth of 25 mm into the cavity of the mould.

The frame section is fixed to the supporting corset by clamps.

B. Produciton Production the covering layer

The mould described under A. is introduced into a closed chamber and preheated with hot air to 100°C. A PVC-plasticiser paste is then sprayed on the internal surface of the jacket, the core and the frame section at this temperature with a spray gun to produce a layer of 0.5 to 0.7 mm in thickness.

This paste consists of
- 440 parts by weight of a polyvinyl chloride homopolymer with K-value 70, bulk density 0.3 g/cm$^3$ and particle size less than 10 $\mu$;
- 385 parts by weight of a polyvinyl chloride homopolymer with K-value 65, bulk density 0.65 g/cm$^3$ and particle size ≤ 150 $\mu$;
- 220 parts by weight of dioctylphthalate;
- 22 parts by weight of tall oil (Loxiol W 502);
- 44 parts by weight of tin mercaptide;
- 33 parts by weight of epoxidised soya bean oil;
- 11 parts by weight of cadmium sulphide or selenide (Trade name Cadmopurrot BNPM).

The paste which is of a suitable consistency for spraying is prepared at 20° to 30°C using a high speed stirrer.

In order to obtain a homogeneous and completely closed covering layer
a. the operating temperature must be kept;
b. there must be practically no temperature gradient across the surface of the apparatus, i.e. uniform heating is necessary;
c. the viscosity of the covering layer must be higher than the viscosity of the foam.

C. Production of the foam core

After application of the covering layer according to B., the mould is removed from the chamber, cooled, closed by means of the frame section described under A. and coated according to B., except for a feed opening. The mould is held obliquely while filling through this opening with approximately 8650 g of a thermoplastic granulate which has been prefoamed to a density of 0.86 g/cm$^3$. The granulate has the following composition (figures based on 100 parts of thermoplastic moulding compound):

100 parts by weight
{
- 30.0 parts by weight of a graft polymer of 35% by weight of styrene and 15% by weight of acrylonitrile on 50% by weight of a butadiene-styrene copolymer 90:10;
- 70.0 parts by weight of styrene-acrylonitrile copolymer 70:30, $\eta_i = 0.60$ (0.5% solution in dimethylformamide at 20°C);
- 2.0 parts by weight of the bis-stearylamide of ethylene diamine;
- 3.0 parts by weight of polypropylene glycol, molecular weight 1800;
- 2.0 parts by weight of azodicarbonamide.
}

Bulk density of the granulate: approximately 520 g/l.

The mould is then completely shut by means of the last bar of the frame section and introduced into a heating chamber in which a stream of air at a temperature of 300°C heats it to a temperature of from 180° to 185°C. It is maintained at this temperature for about 10 minutes, after which the mould is sprayed with a spray of atomised water and the product is removed from the mould.

The resulting product is a trough shaped moulded article weighing about 9.8 kg consisting of a closed covering layer and a core of foam which has a uniform density of 0.52 g/cm$^3$.

EXAMPLES 2 – 5

The procedure is the same as described in Example 1 but using the following prefoamed thermoplastic granulates (Figures based on 100 parts by weight of thermoplastic moulding composition).

EXAMPLE 2

100 parts by weight
{
- 40.0 Parts by weight of a graft polymer of 35% by weight of styrene and 15% by weight of acrylonitrile on 50% by weight of a copolymer of 95% by weight of butylacrylate and 5% by weight of methacrylamidomethylolmethylether;
- 60.0 parts by weight of a 70:30 styrene-acrylonitrile copolymer, $\eta_i = 0.60$ (0.5% solution in DMF at 20°C);
- 2.0 parts by weight of the bis-stearylamide of ethylene diamine;
- 3.0 parts by weight of polypropylene glycol with molecular weight 3000;
- 2.0 parts by weight of azodicarbonamide.
}

Bulk density of the granulate: 570 g/l.

EXAMPLE 3

30.0 Parts by weight of the graft polymer described in Example 1;
70.0 parts by weight of a 70:30 copolymer of $\alpha$-methylstyrene and acrylonitrile, $\eta_i = 0.65$ (0.5% solution in DMF).
Additives as in Example 1.
Bulk density of granulate: 620 g/l.

EXAMPLE 4

100 parts by weight
{
- 35.0 Parts by weight of a graft polymer of 14% by weight of styrene, 5% by weight of acrylonitrile and 31% by weight of methylmethacrylate on 50% by weight of polybutadiene;
- 60.0 parts by weight of a terpolymer of 28% by weight of styrene, 11% by weight of acrylonitrile and 61% by weight of methylmethacrylate having an intrinsic viscosity [$\eta_i$] of 0.63 (0.5% solution in DMF at 20°C).
}

The other additives are the same as in Example 1.
Bulk density of the granulate: 580 g/l.

EXAMPLE 5

100.0 Parts by weight of a graft polymer of 87.5 percent by weight of a mixture of 75 percent by weight of styrene and 25 percent by weight of acrylonitrile on 12.5 percent by weight of an ethylene-propylene terpolymer (tercomponent: ethylidene-norbornene) Trade name: Epsyn;
1.5 parts by weight of calcium stearate;
1.5 parts by weight of the bis-stearylamide of ethylene diamine;
2.0 parts by weight of benzazimide.
Bulk density of the granulate: 640 g/l.

In Examples 2 to 5, a trough shaped moulded article having a completely closed covering layer on all sides and a foam core is obtained which has a uniform density substantially equal to the bulk density of the granulate used as starting material.

EXAMPLE 6

A. Mould

A two-part mould consisting of an L-shaped jacket and an L-shaped core as illustrated in FIG. 1 is used.

The material used for the mould is 1.5 mm steel sheet. Details of the construction of the mould are the same as described in Example 1.

B. Preparation and formation of the covering layer

The parts of the mould are introduced into a closed heating chamber and preheated to 100°C with hot air. A layer of PVC-plasticiser paste 0.8 to 1 mm in thickness is then sprayed on the internal surfaces of the jacket and core at this temperature, using a spray gun. The PVC-plasticiser paste has the following composition:

840.0 parts by weight of polyvinyl chloride with K-value 70, bulk density 0.65 g/cm$^3$ and particle size <10 $\mu$;

735.0 parts by weight of polyvinyl chloride with K-value 65, bulk density 0.65 g/cm$^3$ and particle size ≤ 500 $\mu$;

42.0 parts by weight of tall oil (Trade name: Loxiol W 502); 63.0 parts by weight of epoxidised soya bean oil; 105.0 parts by weight of barium-cadmium laurate;

420.0 parts by weight of plasticiser which can be cross-linked (Trade name Pleximon 701);

105.0 parts by weight of dioctylphthalate;

84.0 parts by weight of iron brown (pigment) and 8.0 parts by weight of dicumyl peroxide.

The peroxide was added to the finished paste immediately before it was sprayed on the mould.

The procedure is otherwise the same as described under B. in Example 1.

C. Preparation of the foam core

After application of the covering layer according to B., the two halves of the mould are removed from the chamber and when cooled to room temperature the mould is closed with a frame section (also coated), in principle the same as described in Example 1, but leaving a feed opening. The mould is held obliquely while filled through this feed opening with about 7,400 g of a prefoamed thermoplastic granulate of the following composition (figures based on 100 parts by weight of the thermoplastic moulding compound):

100 parts by weight
{
30.0 Parts by weight of a graft polymer of 35% by weight of styrene and 15% by weight of acrylonitrile on 50% by weight of highly cross-linked polybutadiene;
70.0 parts by weight of 70:30 styrene-acrylonitrile copolymer, $\eta_i = 0.60$ (0.5% solution in DMF at 20°C);
2.0 parts by weight of the bis-stearyl-amide of ethylene diamine;
3.0 parts by weight of a polypropylene glycol of molecular weight 1000;
2.0 parts by weight of azodicarbonamide.
}

0.5 Parts by weight of sodium bicarbonate per 100 parts by weight of mixture are added before the mixture is compounded so that after granulation a prefoamed granulate having a bulk density of 520 g/l is obtained.

The procedure is otherwise the same as in Example 1. The product removed from the mould is an L-shaped moulded article weighing about 9.8 kg which has a foam core with a uniform density of about 0.52 g/cm$^3$. This foam core is completely covered on all sides with a covering layer consisting of a PVC which contains predominantly a polymeric plasticiser. The quantity of monomeric plasticiser in it is so small that even in the event of its migration the properties of the adjacent foam are not affected.

EXAMPLE 7

The procedure is the same as in Example 6 but
1. the thermoplastic moulding compound used for producing the foam core is a pure styrene-acrylonitrile copolymer ($\eta_i = 0.75$) in the form of a prefoamed granulate. The other additives are the same.
2. The plasticiser which can be cross-linked used for producing the covering layer is trimethylpropane trimethacrylate (Trade name: Pleximon 786).

EXAMPLE 8

A. Mould

The mould used consists basically of two boxes, the larger box serving as a jacket which is tipped over the smaller box which is the core. A beading in the form of a flat bar extends round the outside of the edge of the small box used as core so as to keep the larger box in a fixed position when it is tipped over the smaller box. Dimensions:

|  | Height | Width | Depth |  |
|---|---|---|---|---|
| Small box (hollow core) | 760 | 325 | 305 | mm |
| Large box (jacket) | 790 | 355 | 320 | mm |

Both boxes are made of pieces of 1.5 mm steel sheet welded together and are reinforced by a corset made of a square hollow section with external dimensions 30 × 30 mm to maintain their shape.

Figure 3:
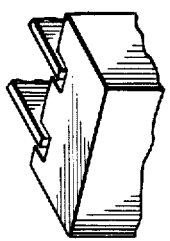
FIG. 3 shows the gap between the bottoms of the two boxes in perspective.

To fill the mould, the smaller box, which has a slope of 2° on 4 sides to facilitate removal from the mould, is placed with its feed opening downwards on a jolting table. The large box used as jacket is constructed as a folding box. The mould is assembled by first folding the 4 sides of the larger box round the smaller box like a band so that a groove 5 mm deep on the inside of the outer box fits over the flat bar which forms the edge of the inner box. The lateral surfaces of the boxes, which are almost parallel, have an average distance apart of 15 mm. The bottom of the outer box is then folded down and locked to the three remaining sides. The gap between the bottoms of the two boxes is also 15 mm (see FIG. 3).

B. Production of the covering layer

Internal box (core) and unfolded external box (jacket) are heated to about 120°C by infra-red radiant heating. A covering layer 1.0 to 1.6 mm in thickness is formed by applying the following paste with a trowel:

2,030 Parts by weight of a special polyvinyl chloride paste having a K-value of 70 to 74 (Trade name Geon 121);

870 parts by weight of alkyl (C$_{15}$) sulphonic acid esters of phenol and cresol;

17 parts by weight of a barium-cadmium dilaurate mixture;

8 parts by weight of epoxidised soya bean oil; and 4 parts by weight of chromium oxide (pigment).

The coating is heated with infra-red radiators for about 5 minutes until the gelling process sets in so that the layer loses its tackiness and particles of granulate sprayed on it no longer adhere to it.

C. Preparation of the foam

After application of the layer according to B., the mould is assembled on a jolting table as described under A. The mould is filled with the prefoamed granulate described in B. (1) before the bottom plate is closed. The jolting table is briefly set in vibration several times during the filling process until finally the cavity of the mould is uniformly filled with 6,570 g of granulate. The mould is then closed with the bottom plate and introduced into a circulating air oven which is at a temperature of about 450°C. Heating, cooling and removal of the product from the mould are carried out as described in Example 1. The finished moulded article weighs about 9,500 g.

We claim:

1. A process for producing a moulded article which comprises the steps of applying a vinyl chloride polymer containing a plasticizer to the internal surfces of a mould which is preheated to a temperature of from 30° to 150°C., thereafter completely filling the mould with granules of a thermoplastic or elasticthermoplastic polymer containing a blowing agent and heating the mould to a temperature of from 150° to 270°C. until the vinyl chloride polymer containing a plasticizer has formed a homogeneous covering layer and the thermoplastic or elastic-thermoplastic polymer has formed a foamed core having a uniform density of 0.2 to 0.8 g/cm³ or having zones of different uniform densities in the range of from 0.2 to 0.8 g/cm³, said core comprising
    1. from 5 to 60 percent by weight of a rubbery elastic butadiene or isoprene polymer containing up to 50 percent by weight of copolymerized styrene, acrylonitrile or a lower alkyl ester of acrylic or methacrylic acid or a polyalkyl acrylate or a cis- or trans-polypentenamer or ethylene-propylene terpolymer containing not more than 10 percent by weight of ter-component and
    2. from 95 to 40 percent by weight of polymerised (a) styrene, alkylstyrene, methyl methacrylate or mixtures thereof and (b) styrene, acrylonitrile, alkylacrylonitrile, methyl methacrylate or mixtures thereof in a proportion by weight of (a):(b) in the range of from 95:5 to 50:50, in which the monomers (2) have been completely or partially polymerised in the presence of polymer (1) and a residue of the monomers (2) has been added in the form of a separately made copolymer, and said covering layer comprising a. from 30 to 85 percent by weight of a vinyl chloride copolymer containing up to 20 percent by weight of comonomers with a K-value according to Fikentscher of from 55 to 80, which is suitable for the preparation of a plastisol; or a mixture of from 90 to 30 percent by weight, of a vinyl chloride polymer which has a K-value of from 55 to 80 and a particle size of from 0.2 to 50 $\mu$, and from 10 to 70 percent by weight of a vinyl chloride polymer which has a K-value of from 55 to 80 and a particle size of from 50 to 500$\mu$ and b. from 70 to 15 percent by weight of a saturated or unsaturated monomeric plasticiser or mixtures thereof in which the vinyl chloride polymers are not completely soluble.

2. The process as claimed in claim 1 wherein the vinyl chloride polymer containing a plasticiser is applied to the mould by brush coating, trowelling or spraying.

3. The process as claimed in claim 1, wherein the blowing agent is azodicarbonamide or a sulphohydrazide.

4. The process as claimed in claim 1, wherein the blowing agent is benzazimide.

5. The process as claimed in claim 1, wherein the blowing agent is a hydrocarbon or a halogenated hydrocarbon having a boiling point below the second order tansition temperature of the polymer used.

* * * * *